United States Patent
Kim et al.

(10) Patent No.: US 12,191,451 B2
(45) Date of Patent: Jan. 7, 2025

(54) ELECTROLYTE SOLUTION FOR LITHIUM-SULFUR BATTERY AND LITHIUM-SULFUR BATTERY COMPRISING SAME

(71) Applicants: LG CHEM, LTD., Seoul (KR); KOREA ADVANCED INSTITUTE OF SCIENCE AND TECHNOLOGY, Daejeon (KR)

(72) Inventors: Yun Kyoung Kim, Daejeon (KR); Hee Tak Kim, Daejeon (KR); Doo Kyung Yang, Daejeon (KR); Hyungjun Noh, Daejeon (KR); Hyunwon Chu, Daejeon (KR)

(73) Assignees: LG ENERGY SOLUTION, LTD., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 276 days.

(21) Appl. No.: 16/768,979

(22) PCT Filed: Apr. 3, 2019

(86) PCT No.: PCT/KR2019/003918
§ 371 (c)(1),
(2) Date: Jun. 2, 2020

(87) PCT Pub. No.: WO2019/212153
PCT Pub. Date: Nov. 7, 2019

(65) Prior Publication Data
US 2021/0226254 A1    Jul. 22, 2021

(30) Foreign Application Priority Data
Apr. 30, 2018 (KR) .................. 10-2018-0049928

(51) Int. Cl.
*H01M 10/0568* (2010.01)
*H01M 4/38* (2006.01)
(Continued)

(52) U.S. Cl.
CPC ..... *H01M 10/0568* (2013.01); *H01M 10/052* (2013.01); *H01M 10/0569* (2013.01);
(Continued)

(58) Field of Classification Search
None
See application file for complete search history.

(56) References Cited

U.S. PATENT DOCUMENTS 6,030,720 A    2/2000  Chu et al.
6,162,562 A   12/2000  Tsuji et al.
(Continued)

FOREIGN PATENT DOCUMENTS

CN    1280711 A    1/2001
CN    1335653 A    2/2002
(Continued)

OTHER PUBLICATIONS

Cuisinier et al., "Radical or Not Radical: Revisiting Lithium-Sulfur Electrochemistry in Nonaqueous Electrolytes", Advanced Energy Materials, 2015, vol. 5, No. 16, 1401801, Total 6 pages.
(Continued)

*Primary Examiner* — Jonathan Crepeau
(74) *Attorney, Agent, or Firm* — Birch, Stewart, Kolasch & Birch, LLP

(57) ABSTRACT

An electrolyte solution for a lithium-sulfur battery including: a lithium salt, which includes an anion having a donor number of 15 kcal/mol of more, and a non-aqueous solvent, and a lithium-sulfur battery including the same.

3 Claims, 7 Drawing Sheets

(51) Int. Cl.
*H01M 10/052* (2010.01)
*H01M 10/0569* (2010.01)

(52) U.S. Cl.
CPC ...... *H01M 4/38* (2013.01); *H01M 2300/0025* (2013.01); *H01M 2300/0037* (2013.01)

(56) References Cited

U.S. PATENT DOCUMENTS

| | | | |
|---|---|---|---|
| 2002/0045102 A1* | 4/2002 | Jung | H01M 4/5815 429/105 |
| 2002/0102466 A1 | 8/2002 | Hwang et al. | |
| 2004/0067418 A1 | 4/2004 | Kim et al. | |
| 2004/0157132 A1 | 8/2004 | Kim et al. | |
| 2005/0053838 A1 | 3/2005 | Ryu et al. | |
| 2005/0053842 A1 | 3/2005 | Ryu et al. | |
| 2005/0147886 A1 | 7/2005 | Mikhaylik | |
| 2005/0175903 A1 | 8/2005 | Kim et al. | |
| 2006/0177741 A1 | 8/2006 | Kolosnitsyn et al. | |
| 2007/0082264 A1 | 4/2007 | Mikhaylik | |
| 2007/0082270 A1 | 4/2007 | Mikhaylik | |
| 2013/0309572 A1 | 11/2013 | Zhang et al. | |
| 2015/0249260 A1 | 9/2015 | Brückner et al. | |
| 2015/0340696 A1 | 11/2015 | Son et al. | |
| 2016/0149218 A1 | 5/2016 | Liu et al. | |
| 2016/0233487 A1 | 8/2016 | Jun et al. | |
| 2017/0263978 A1 | 9/2017 | Koh et al. | |
| 2018/0301739 A1 | 10/2018 | Park et al. | |
| 2019/0051940 A1 | 2/2019 | Park et al. | |

FOREIGN PATENT DOCUMENTS

| | | | |
|---|---|---|---|
| CN | 1591934 A | | 3/2005 |
| CN | 101107733 A | | 1/2008 |
| CN | 101834310 A | | 9/2010 |
| CN | 104143614 | * | 11/2014 |
| CN | 105845965 A | | 8/2016 |
| CN | 107078344 A | | 8/2017 |
| CN | 107623143 | * | 1/2018 |
| CN | 107293797 A | | 11/2024 |
| EP | 1 178 555 A2 | | 2/2002 |
| EP | 3 282 514 A1 | | 2/2018 |
| JP | 11-135147 A | | 5/1999 |
| JP | 2002-334698 A | | 11/2002 |
| JP | 2003-123840 A | | 4/2003 |
| JP | 2003-163004 A | | 6/2003 |
| JP | 2004-172126 A | | 6/2004 |
| JP | 2005-85760 A | | 3/2005 |
| JP | 2005-85761 A | | 3/2005 |
| JP | 2007-518230 A | | 7/2007 |
| JP | 2012-142101 A | | 7/2012 |
| JP | 2014-518001 A | | 7/2014 |
| JP | 2015-531977 A | | 11/2015 |
| KR | 10-0472509 B1 | | 3/2005 |
| KR | 10-2005-0038895 A | | 4/2005 |
| KR | 10-1166274 B1 | | 7/2012 |
| KR | 10-2015-0093121 A | | 8/2015 |
| KR | 10-2017-0067648 A | | 6/2017 |
| KR | 10-2017-0121047 A | | 11/2017 |
| KR | 10-1841278 B1 | | 3/2018 |
| WO | WO 2006/077380 A2 | | 7/2006 |
| WO | WO 2012/161989 A1 | | 11/2012 |
| WO | WO 2017/099420 A1 | | 6/2017 |
| WO | WO 2017/183810 A1 | | 10/2017 |

OTHER PUBLICATIONS

Gerber et al., "3-Dimensional Growth of Li2S in Lithium-Sulfur Batteries Promoted by a Redox Mediator", Nano Letters, 2015, vol. 16, No. 1, pp. 549-554.
International Search Report (PCT/ISA/210) issued in PCT/KR2019/003918 mailed on Jul. 12, 2019.
Pan et al., "Non-encapsulation approach for highperformance Li—S batteries through controlled nucleation and growth", Nature Energy, 2017, vol. 2, No. 10, pp. 813-820.
Wu et al., "Lithium Iodide as a Promising Electrolyte Additive for Lithium-Sulfur Batteries: Mechanisms of Performance Enhancement", Advanced Materials, 2014, vol. 27, No. 1, pp. 101-108.
Wu et al., "Toward In-Situ Protected Sulfur Cathodes by Using Lithium Bromide and Pre-Charge", Nano Energy, 2017, vol. 40, No. 2017, pp. 170-179, Total 23 pages.
Zou et al., "Solvent-Dictated Lithium Sulfur Redox Reactions: An Operando UV-vis Spectroscopic Study", The Journal of Physical Chemistry Letters, 2016, vol. 7, No. 8, pp. 1518-1525.
Extended European Search Report for European Application No. 19796166.7, dated Feb. 3, 2021.
Linert et al., "Donor Numbers of Anions in Solutions: the Use of Solvatochromic Lewis Acid-Base Indicators", Journal of the Chemical Society Dalton Transaction, No. 21, 1993, pp. 3181-3186.

* cited by examiner

[Figure 1]
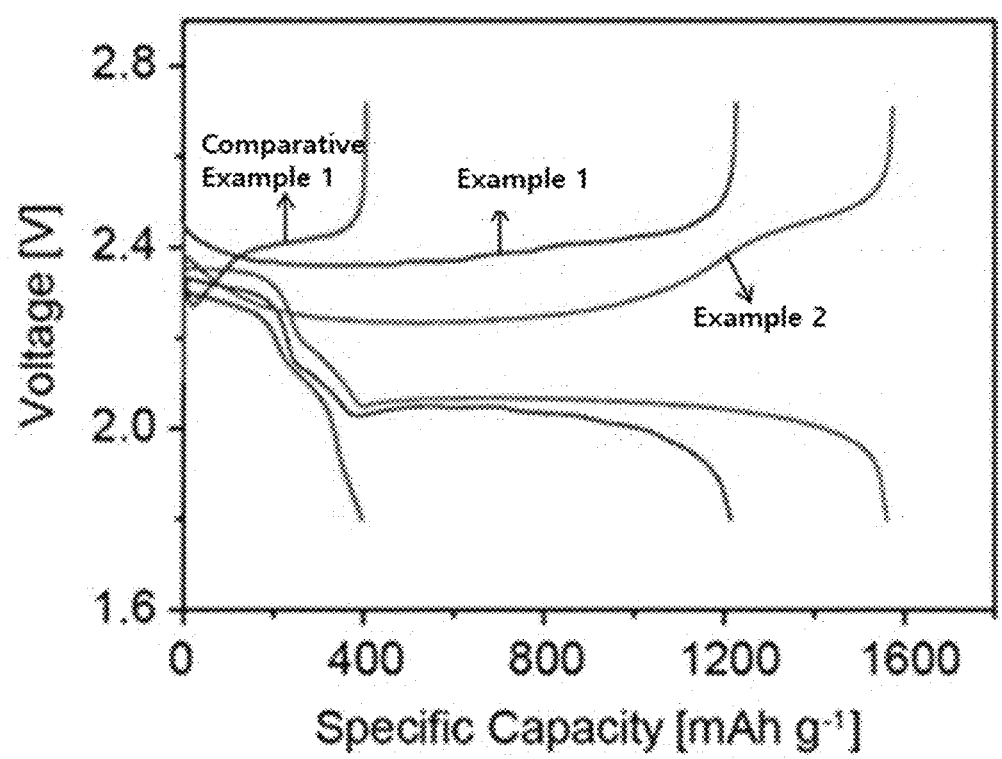

[Figure 2]
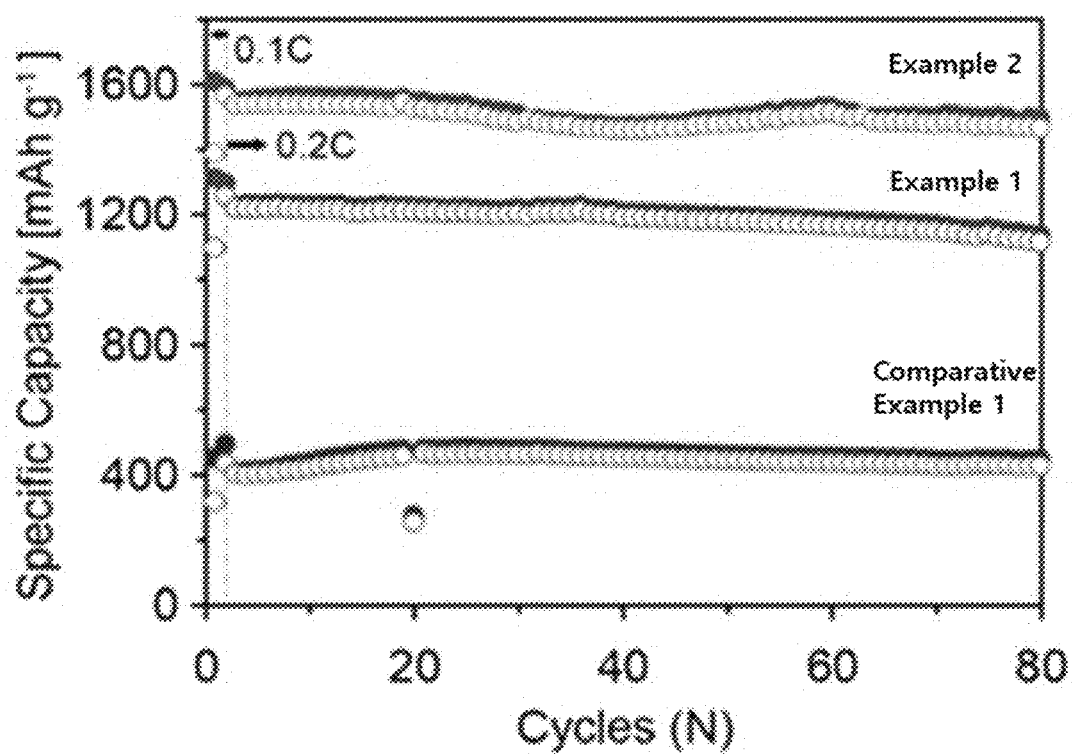

[Figure 3]
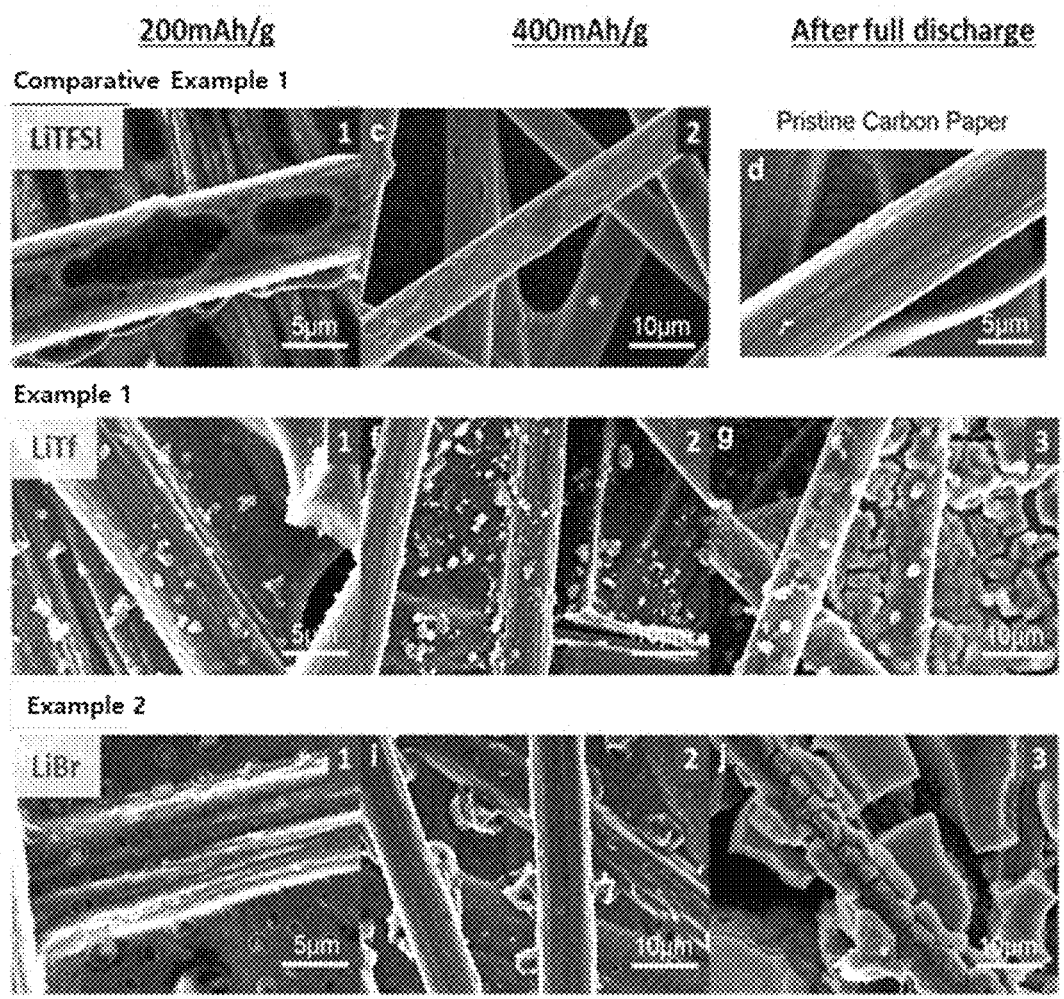

[Figure 4]
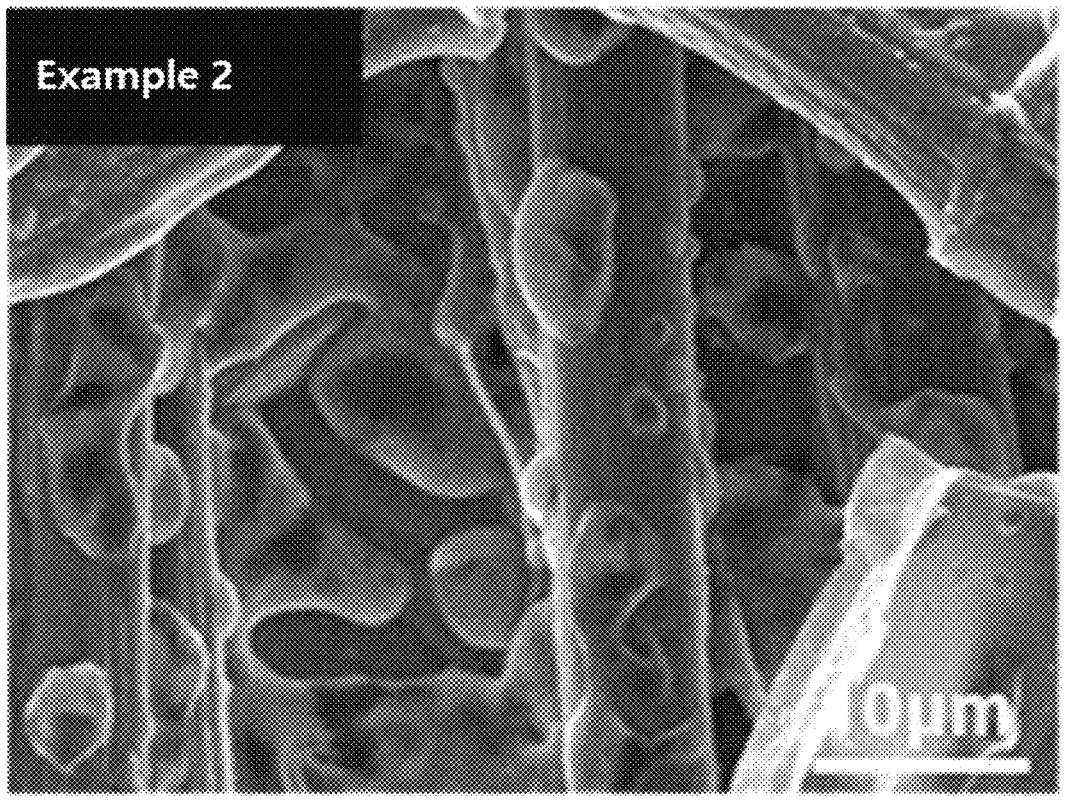

[Figure 5]
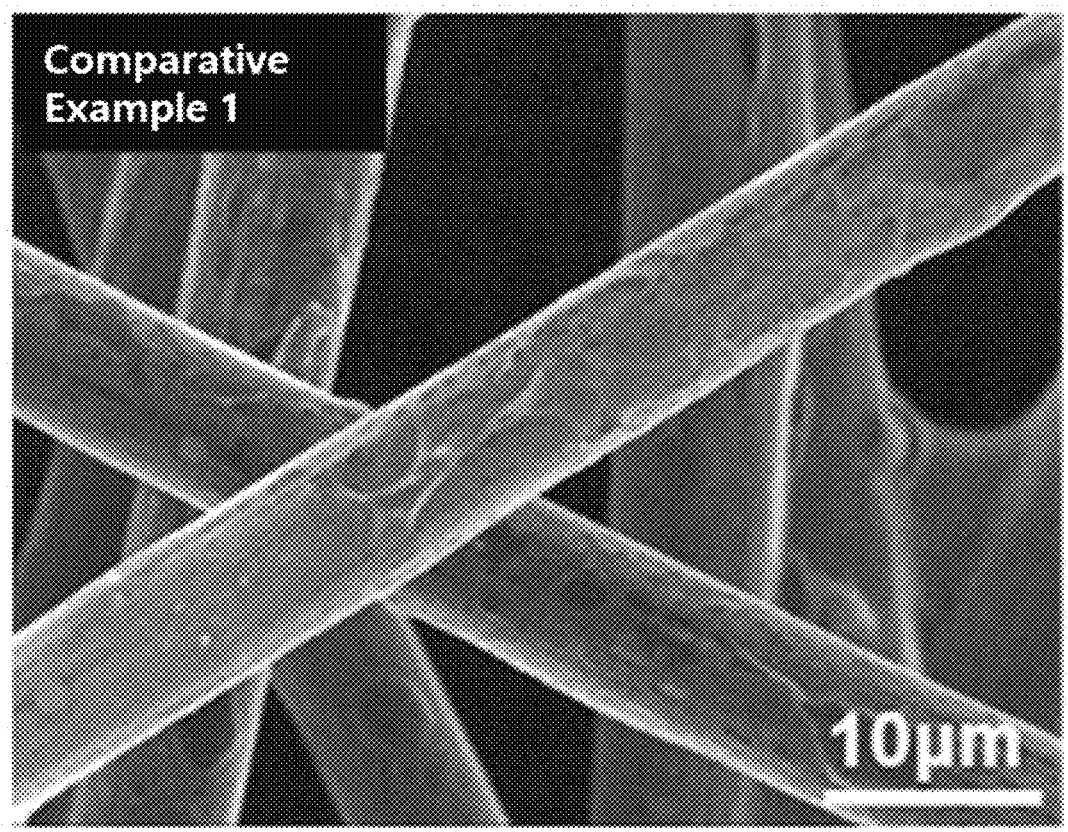

[Figure 6]
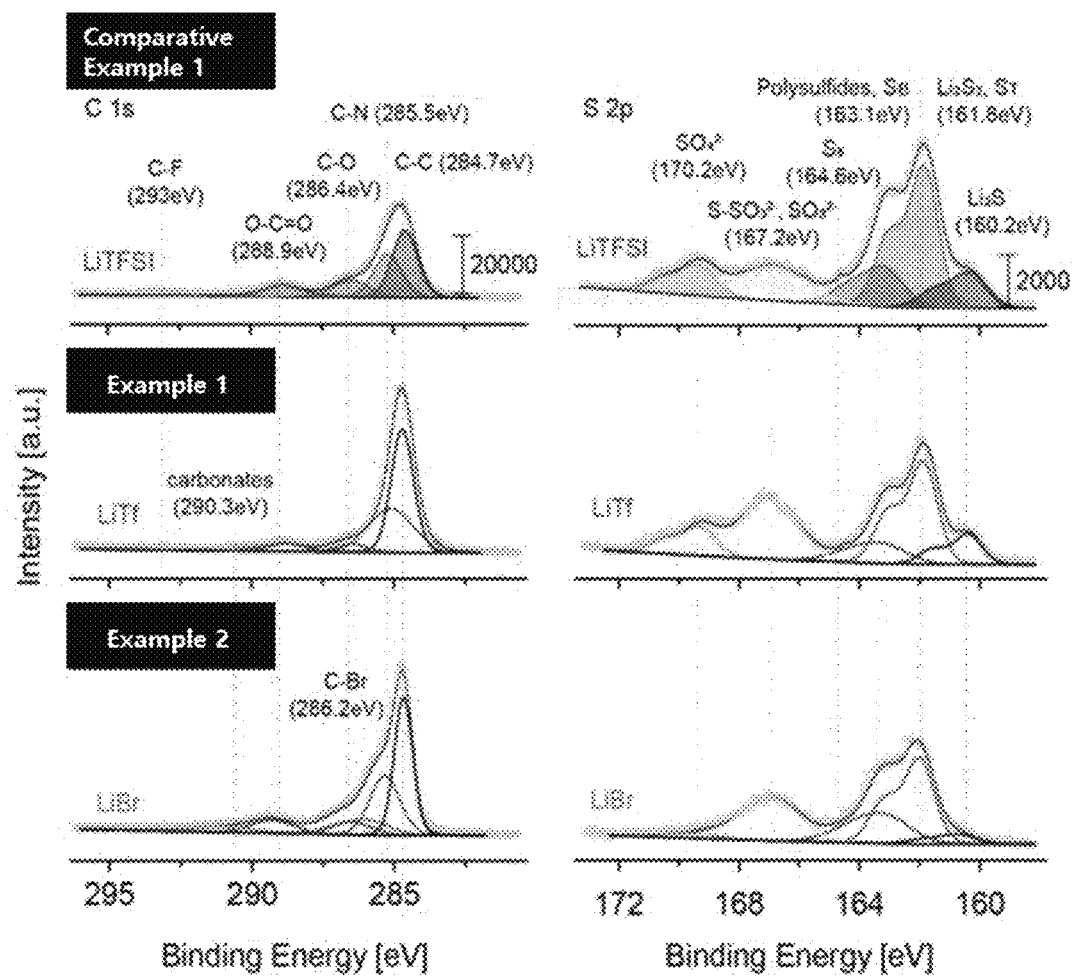

[Figure 7]
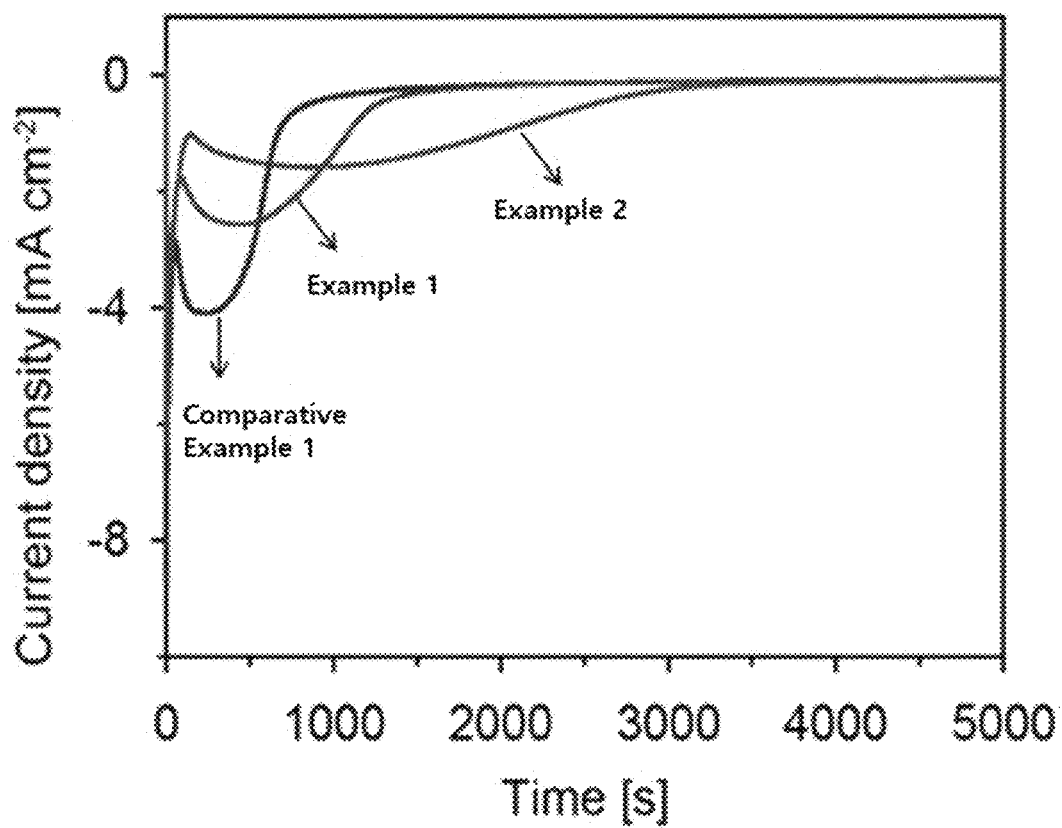

ELECTROLYTE SOLUTION FOR LITHIUM-SULFUR BATTERY AND LITHIUM-SULFUR BATTERY COMPRISING SAME

TECHNICAL FIELD

The present application claims priority to and benefits of Korean Patent Application No. 10-2018-0049928 filed on Apr. 30, 2018, the entire disclosure of which are incorporated herein by reference its entirety.

The present invention relates to an electrolyte solution for a lithium-sulfur battery and a lithium-sulfur battery comprising the same.

BACKGROUND ART

Recently, as portable electronic devices, electric vehicles, large-capacity power storage systems and the like have been developed, the need for large-capacity batteries is increasing. The lithium-sulfur battery is a secondary battery using a sulfur-based material having a sulfur-sulfur bond (S—S bond) as a positive electrode active material and using lithium metal as a negative electrode active material. The Lithium-sulfur battery has advantages in that sulfur, which is the main material of the positive electrode active material, is very rich in resources, is not toxic, and has a low atomic weight.

In addition, the theoretical discharge capacity of the lithium-sulfur battery is 1672 mAh/g-sulfur, and its theoretical energy density is 2,600 Wh/kg. Since the energy density of the lithium-sulfur battery is much higher than the theoretical energy density of other battery systems currently under study (Ni-MH battery: 450 Wh/kg, Li—FeS battery: 480 Wh/kg, Li—MnO$_2$ battery: 1,000 Wh/kg, Na—S battery: 800 Wh/kg), the lithium-sulfur battery has attracted attention as a battery having high energy density characteristics.

The first problem to be solved for the commercialization of the lithium-sulfur battery is the low lifetime characteristics of the battery due to lithium polysulfide. The lithium polysulfide (Li$_2$S$_x$, x=8, 6, 4, 2) is an intermediate product produced during the electrochemical reaction of the lithium-sulfur battery, which has high solubility in organic electrolyte solution. The lithium polysulfide dissolved in the electrolyte solution is gradually diffused toward the negative electrode and deviates from the electrochemical reaction region of the positive electrode, so that it cannot participate in the electrochemical reaction of the positive electrode, eventually resulting in a capacity loss.

In addition, the release of lithium polysulfide decreases the ionic conductivity by increasing the viscosity of the electrolyte solution, and the lithium polysulfide reacts with the lithium metal negative electrode due to the continuous charging/discharging reaction and thus the lithium sulfide (Li$_2$S) is adhered to the surface of the lithium metal, thereby causing problems that the reaction activity is lowered and the potential characteristics are deteriorated.

Most studies to address these problems have focused on the modification of the positive electrode. Specifically, as one of the ways to increase the electrical conductivity of the electrode, an attempt has been made to minimize the conductivity drop of lithium sulfide-accumulated electrodes by adding an electrically conductive material of carbon material or control the formation and accumulation of intermediate products and lithium sulfide using a sulfur carrier with a nanostructure.

However, for most of the above technologies, it is difficult to use commercially, and it is only possible to use up to 70% of the theoretical capacity.

Therefore, it is still necessary to develop a battery having a high discharging capacity and delaying the passivation of the electrode due to the lithium sulfide.

DISCLOSURE

Technical Problem

It is an object of the present invention to provide an electrolyte solution for a lithium-sulfur battery, which is capable of delaying passivation of an electrode due to the lithium sulfide, which is a non-conductor, by increasing dissociation degree of the lithium sulfide, and exhibiting a higher discharging capacity.

In addition, it is another object of the present invention to provide a lithium-sulfur battery comprising the electrolyte solution.

Technical Solution

In order to achieve the above objects, the present invention provides an electrolyte solution for a lithium-sulfur battery comprising: a non-aqueous solvent and a lithium salt, wherein the lithium salt comprises an anion having a donor number of 15 kcal/mol or more.

In addition, the present invention provides a lithium-sulfur battery comprising: a positive electrode and a negative electrode arranged opposite to each other; a separator interposed between the positive electrode and the negative electrode; and an electrolyte solution which is impregnated in the positive electrode, the negative electrode and the separator and has ion conductivity, wherein the electrolyte solution is the electrolyte solution for the lithium-sulfur battery of the present invention.

Advantageous Effects

The electrolyte solution for the lithium-sulfur battery of the present invention increases the dissociation degree of the lithium sulfide, thereby delaying the passivation of the electrode due to the lithium sulfide, which is a non-conductor, and exhibiting higher discharging capacity.

DESCRIPTION OF DRAWINGS

FIG. 1 is a graph of capacity implementation in the constant current operation of Examples 1 and 2, and Comparative Example 1.

FIG. 2 is a graph of the battery lifetime characteristics of Examples 1 and 2 and Comparative Example 1.

FIG. 3 is a SEM photograph of the electrodes of Examples 1 and 2, and Comparative Example 1 after the completion of discharging.

FIG. 4 is a SEM photograph of the electrode of Example 2 after the completion of discharging.

FIG. 5 is a SEM photograph of the electrode of Comparative Example 1 after the completion of discharging.

FIG. 6 is an XPS graph of the surfaces of the electrodes of Examples 1 and 2, and Comparative Example 1 after the completion of the discharging.

FIG. 7 is a graph of surface passivation rate of electrodes in Examples 1 and 2 and Comparative Example 1 using chronoamperometry.

BEST MODE

Hereinafter, the present invention will be described in more detail.

For the lithium metal battery, the lithium metal used as the negative electrode active material has a high energy density (3,860 mAh/g) while having low oxidation/reduction potential (−3.045 V vs. standard hydrogen electrode) and atomic weight (6.94 g/a.u.). Therefore, since it is possible to achieve a high capacity and a high energy density while enabling miniaturization and weight reduction, the lithium metal battery is attracting attention as a next-generation battery.

However, as described above, lithium metal has high reactivity and thus is very weak in terms of stability. Also, for a lithium-sulfur battery which uses sulfur-based materials as a positive electrode active material, lithium polysulfide ($Li_2S_x$, usually x>4) with the high oxidation number of sulfur, among lithium polysulfide ($Li_2S_x$, x=8, 6, 4, 2) formed in the positive electrode during the operation of the battery, has a high solubility in the electrolyte solution comprising a hydrophilic organic solvent and thus is continuously dissolved therein and released outside the reaction zone of the positive electrode, thereby moving to the negative electrode. At this time, the lithium polysulfide released from the positive electrode causes a side reaction with the lithium metal, and thus the lithium sulfide is adhered to the surface of lithium metal. Therefore, there are problems that the passivation of the electrode appears quickly and it is possible to realize only up to about 70% of the theoretical discharging capacity (1672 mAh/g-sulfur).

For this, in the prior art, a method of changing the solvent composition of the electrolyte solution and a method of using additives, etc. were used, but there is a problem that such methods have a severe side reaction with lithium metal and cannot be used for cycle operation due to compatibility problem with the negative electrode.

Additionally, in the prior art, in order to increase ionic conductivity, a salt from which an ion is well dissociated was used as a lithium salt, which is contained in the electrolyte solution of the lithium-sulfur battery, and bis(trifluoromethane)sulfonimide lithium salt(($(CF_3SO_2)_2NLi$) (hereinafter referred to as LiTFSI) was mainly used.

The LiTFSI has been widely used in the prior art because it has a small side reaction with the current collector and the electrode and generates less gas. However, in the prior art, the problems that the dissociation degree for lithium sulfide is not excellent and thus electrode passivation occurs has not been recognized. Therefore, even if the method of changing the solvent composition of the electrolyte solution and the method of using additives, etc. were used, the above problems are still not improved.

Therefore, the present invention was intended to provide an electrolyte solution for a lithium-sulfur battery, which increases the degree of dissociation of the lithium sulfide to induce three-dimensional growth of the lithium sulfide, thereby delaying the passivation of the electrode and thus achieving a capacity of about 90% or more relative to the theoretical capacity of the lithium metal battery.

Electrolyte Solution for Lithium-Sulfur Battery

The present invention relates to an electrolyte solution for a lithium-sulfur battery comprising: a non-aqueous solvent and a lithium salt, wherein the lithium salt comprises anions having a donor number (DN) of 15 kcal/mol or more.

The donor number is a measure of the Lewis base of a specific ion proposed by Gutmann. The higher the donor number is, the better the role of contributing the electron to surrounding ions or molecules that lack electrons can be performed. Therefore, if a lithium salt containing an anion having a high donor number is used, as the affinity with lithium ion increases, the degree of dissociation to lithium sulfide increases due to the relative common ion effect, and from this, it can induce the three-dimensional growth of lithium sulfide in the electrode, specifically in the positive electrode, and thus it is possible to induce a good capacity implementation rate compared to the theoretical capacity of the lithium-sulfur battery.

The lithium sulfide is a non-conductor, which grows two-dimensionally on the surface of the electrode composed of carbon, thereby quickly passivating the surface of the electrode, and thus resulting in the passivation of the electrode. However, the present invention can inhibit the passivation of the electrode by inducing the three-dimensional growth of the lithium sulfide in the electrode using a lithium salt comprising an anion having a donor number of 15 kcal/mol or more.

In the present invention, the lithium salt is a lithium salt comprising an anion having a donor number of 15 kcal/mol or more, and the lithium salt comprises at least one selected from the group consisting of LiBr, $LiCF_3SO_3$, $LiNO_3$, LiOAc, LiCl, LiSCN, LiI and LiCN, and preferably comprises LiBr.

The lithium salt comprising the anion having the donor number of 15 kcal/mol or more is excellent in the degree of dissociation to the lithium sulfide, so that the lithium sulfide can grow into the three-dimensional structure on the electrode. Therefore, even if the lithium sulfide is adhered to the electrode, it does not completely cover the active surface of the electrode and thus can delay the passivation of the electrode, which can induce a high capacity of the lithium-sulfur battery.

In addition, the donor number of an anion of a lithium salt may be preferably 15 to 50 kcal/mol.

The lithium salt comprising the anion having the donor number less than 15 kcal/mol is not excellent in the degree of dissociation to lithium sulfide, and thus the lithium sulfide grows two-dimensionally on the electrode and covers the entire active surface area of the electrode, so that the passivation of the electrode occurs rapidly and the capacity of the lithium-sulfur battery is not excellent.

In addition, if the donor number is more than 50 kcal/mol, the affinity with the lithium ion is high, and thus the concentration of dissociated lithium ions in the electrolyte may be decreased, thereby causing a decrease in ionic conductivity and resulting in a problem of reduction in the solubility of the lithium salt itself.

The lithium salt is contained in the electrolyte solution for lithium-sulfur battery at a concentration of 0.1 to 8M, preferably at a concentration of 1 to 4M. If the lithium salt is contained at a concentration of less than 0.1 M, it is difficult to secure ion conductivity suitable for battery operation. If the lithium salt exceeds 8M, the viscosity of the electrolyte solution increases and thus the mobility of the lithium ion decreases, and the performance of the battery may be deteriorated due to the increase in the decomposition reaction of the lithium salt itself.

The non-aqueous solvent is a medium through which ions involved in the electrochemical reaction of the lithium-sulfur battery can move.

In the present invention, an ether-based solvent may be used as the non-aqueous solvent, and the ether-based solvent comprises at least one selected from the group consisting of linear ethers and cyclic ethers.

The linear ether may comprise at least one selected from the group consisting of dimethyl ether, diethyl ether, dipropyl ether, dibutyl ether, diisobutyl ether, ethyl methyl ether, ethyl propyl ether, ethyl tert-butyl ether, dimethoxy methane, trimethoxymethane, dimethoxyethane, diethoxyethane, dimethoxypropane, diethylene glycol dimethyl ether, diethylene glycol diethyl ether, triethylene glycol dimethyl ether, tetraethylene glycol dimethyl ether, ethylene glycol divinyl ether, diethylene glycol divinyl ether, triethylene glycol divinyl ether, dipropylene glycol dimethyl ether, butylene glycol ether, diethylene glycol ethyl methyl ether, diethylene glycol isopropyl methyl ether, diethylene glycol butyl methyl ether, diethylene glycol tert-butyl ethyl ether and ethylene glycol ethyl methyl ether.

In addition, the cyclic ether may comprise at least one selected from the group consisting of dioxolane, methyldioxolane, dimethyldioxolane, vinyldioxolane, methoxydioxolane, ethylmethyldioxolane, oxane, dioxane, trioxane, tetrahydrofuran, methyltetrahydrofuran, dimethyltetrahydrofuran, dimethoxytetrahydrofuran, ethoxytetrahydrofuran, dihydropyrane, tetrahydropyran, furan and methylfuran.

It is advantageous that the linear ether and the cyclic ether in a volume ratio of 1:0.3 to 1:2, preferably 1:0.7 to 1:1.2, and most preferably 1:1 are used as the non-aqueous solvent, in terms of improvement of the over-voltage phenomenon upon charging and development of an improved energy density. Here, the volume ratio corresponds to the ratio of "% by volume of linear ether":"% by volume of cyclic ether" in the ether-based solvent.

Lithium-Sulfur Battery

In addition, the present invention relates to a lithium-sulfur battery comprising: a positive electrode and a negative electrode arranged opposite to each other; a separator interposed between the positive electrode and the negative electrode; and an electrolyte solution which is impregnated in the positive electrode, the negative electrode and the separator and has ion conductivity, wherein the electrolyte solution is the electrolyte solution for the lithium-sulfur battery of the present invention.

The positive electrode comprises a positive electrode active material formed on a positive electrode current collector.

The positive electrode current collector can be any one that can be used as a current collector in the art, and is preferably foamed aluminum and foamed nickel having excellent conductivity and the like.

The positive electrode active material may comprise elemental sulfur ($S_8$), a sulfur-based compound, or a mixture thereof. Specifically, the sulfur-based compound may be $Li_2S_n$ ($n \geq 1$), an organic sulfur compound or a carbon-sulfur polymer ($(C_2S_x)_n$: x=2.5~50, n≥2). They are applied in combination with conductive material because sulfur material is not electrically conductive by itself.

The conductive material may be porous. Therefore, the conductive material may be used without limitation as long as it has porosity and conductivity, and for example, carbon-based materials having porosity may be used. Such carbon-based materials may comprise carbon black, graphite, graphene, activated carbon, carbon fiber, and the like. In addition, metallic fibers such as metal mesh; metallic powder such as copper, silver, nickel, and aluminum; or organic electrically-conductive materials such as polyphenylene derivatives may be also used. The conductive materials may be used alone or in combination.

The positive electrode may further comprise a binder for binding the positive electrode active material and the conductive material and for binding to the current collector. The binder may comprise a thermoplastic resin or a thermosetting resin. For example, polyethylene, polyethylene oxide, polypropylene, polytetrafluoroethylene (PTEE), polyvinylidene fluoride (PVDF), styrene-butadiene rubber, tetrafluoroethylene-perfluoroalkyl vinyl ether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoropropylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluoroalkylvinylether-tetrafluoroethylene copolymer, and ethylene-acrylic acid copolymer and the like can be used alone or in combination with each other, but are not limited thereto, and any binders that can be used in the art are all possible.

The positive electrode as described above can be prepared by a conventional method. Specifically, the positive electrode can be prepared by applying a composition for forming the layer of the positive electrode active material to the current collector, drying it, and optionally compressing and molding it into a current collector to improve electrode density, wherein the composition is prepared by mixing the positive electrode active material, the conductive material and the binder in an organic solvent. At this time, as the organic solvent, it is preferable to use a solvent which can uniformly disperse a positive electrode active material, a binder and a conductive material, and which is easily evaporated. Specifically, acetonitrile, methanol, ethanol, tetrahydrofuran, water, isopropyl alcohol, and the like can be used as the organic solvent.

The negative electrode may comprise a negative electrode current collector and a negative electrode active material located on the negative electrode current collector. In addition, the negative electrode may be a lithium metal plate.

The negative electrode current collector is for supporting the negative electrode active material and is not particularly limited as long as it is electrochemically stable in the voltage range of the lithium metal battery while having excellent conductivity, and for example, copper, stainless steel, aluminum, nickel, titanium, palladium, sintered carbon, or copper or stainless steel whose surface is treated with carbon, nickel, silver or the like, or aluminum-cadmium alloy or the like may be used.

The negative electrode current collector can enhance the bonding force with the negative electrode active material by having fine irregularities on its surface, and may be formed in various forms such as film, sheet, foil, mesh, net, porous body, foam or nonwoven fabric.

The negative electrode active material may comprise a material capable of reversibly intercalating or deintercalating lithium ion ($Li^+$), a material capable of reacting with lithium ion to reversibly form lithium containing compounds, or lithium metal or lithium alloy. The material capable of reversibly intercalating or deintercalating lithium ion ($Li^+$) can be, for example, crystalline carbon, amorphous carbon, or a mixture thereof. The material capable of reacting with lithium ion ($Li^+$) to reversibly form lithium containing compounds may be, for example, tin oxide, titanium nitrate or silicon. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn). Preferably, the negative electrode active material may be lithium metal, and specifically may be in the form of a lithium metal thin film or lithium metal powder.

The method for forming the negative electrode active material is not particularly limited, and a layer or film forming method commonly used in the art can be used. For example, methods such as compression, coating, or deposition can be used. In addition, a metal lithium thin film formed on a metal plate by initial charging after assembling the battery without the lithium thin film in the current collector is also included in the negative electrode of the present invention.

The electrolyte solution comprises lithium ions and is for causing an electrochemical oxidation or reduction reaction between the positive electrode and the negative electrode through these lithium ions. In the present invention, the electrolyte solution is an electrolyte solution for the lithium-sulfur battery as described above.

The injection of the electrolyte solution can be performed at an appropriate stage of the electrochemical device manufacturing process depending on the manufacturing process and required properties of the final product. That is, the injection of the electrolyte solution can be applied before assembling the electrochemical device or in the final stage of assembling the electrochemical device.

A separator is additionally comprised between the positive electrode and the negative electrode. The separator is used to physically separate both electrodes in the lithium metal battery of the present invention, and may be used without any particular limitations as long as it is commonly used as a separator in the lithium metal battery. Particularly, it is desirable to use a separator having excellent wettability to the electrolyte solution while having low resistance to ion migration of the electrolyte.

The separator may be formed of a porous substrate, and the porous substrate may be any porous substrate commonly used in an electrochemical device. For example, a polyolefin-based porous membrane or a nonwoven fabric may be used as the porous substrate, but it is not particularly limited thereto.

Examples of the polyolefin-based porous membrane may include a membrane formed of polyolefin-based polymer such as polyethylene such as high-density polyethylene, linear low-density polyethylene, low density polyethylene and ultra-high molecular weight polyethylene, polypropylene, polybutylene and polypentene alone or a mixture thereof.

The nonwoven fabric may include, in addition to the polyolefin-based nonwoven fabric, for example, a nonwoven fabric formed of polyester such as polyethyleneterephthalate, polybutyleneterephthalate and polyethylenenaphthalate, polyacetal, polyamide, polycarbonate, polyimide, polyetheretherketone, polyethersulfone, polyphenyleneoxide and polyphenylenesulfide alone or a mixture thereof. The structure of the nonwoven fabric may be a spun bond nonwoven fabric or a melt blown nonwoven fabric each of which is composed of long fibers.

The thickness of the porous substrate is not particularly limited, but may be 1 to 100 µm, preferably 5 to 50 µm.

The size and porosity of the pores present in the porous substrate are also not particularly limited, but may be 0.001 to 50 µm and 10 to 95%, respectively.

The lithium-sulfur battery according to the present invention can be manufactured by lamination (stacking) and folding processes of the separator and the electrodes, in addition to the usual winding process.

The shape of the lithium-sulfur battery is not particularly limited, and may be various shapes such as a cylindrical shape, a laminate shape, and a coin shape.

Hereinafter, preferred examples of the present invention will be described in order to facilitate understanding of the present invention. It will be apparent to those skilled in the art, however, that the following examples are illustrative of the present invention and that various changes and modifications can be made within the scope and spirit of the present invention, and it is obvious that such changes and modifications are within the scope of the appended claims.

<Manufacture of Lithium-Sulfur Battery>

Example 1

$LiCF_3SO_3$ (LiTf, DN of Tf=16.9 kcal/mol) was dissolved in an organic solvent composed of 1,3-dioxolane and 1,2-dimethoxyethane (DOL:DME=1:1 (volume ratio)) at a concentration of 1.0 M to prepare an electrolyte solution.

Sulfur of positive electrode active material in the form of lithium polysulfide was dissolved in the electrolyte and then used. The electrolyte mixed with sulfur and lithium sulfide (mass ratio 4.88:1, molar ratio 7:8) was reacted at 60° C. for 12 hours to dissolve the lithium polysulfide (based on $Li_2S_8$) in the electrolyte. A carbon fiber electrode with an active specific surface area of 1 $m^2/g$ was used as a positive electrode.

A lithium metal plate with a thickness of 450 µm was used as a negative electrode.

The prepared positive electrode and negative electrode were positioned to face each other, and a polypropylene separator was interposed therebetween, and then 30 µl of the electrolyte solution comprising the positive electrode active material was injected to prepare a coin shaped battery.

Example 2

A coin shaped battery was produced in the same manner as in Example 1, except that LiBr (DN of Br=33.7 kcal/mol) was used as the lithium salt.

Comparative Example 1

A coin shaped battery was produced in the same manner as in Example 1, except that LiTFSI (DN of TFSI=5.4 kcal/mol) was used as the lithium salt.

Experimental Example 1: Evaluation of Battery Performance and Analysis of Surface of Electrode (1) Measurement of Constant Current Operation Profile The constant current operation profiles of the batteries manufactured in Examples 1 and 2 and Comparative Example 1 when fixed the charging/discharging rate to 0.335 $mA/cm^2$ (0.2 C) and set the operating voltage to 1.8V to 2.7V were measured (FIG. 1).

The lithium-sulfur battery of Examples 1 and 2 manufactured by using a lithium salt comprising an anion with a DN of 15 or more was improved in the discharging reaction at the lower voltage more efficiently among the discharging reactions at the two voltage regions occurring during the discharging process. On the other hand, the lithium-sulfur battery of Comparative Example 1 showed no improvement in the discharging reaction. Specifically, the discharging capacity of Example 1 was 72.5%, that of Example 2 was 91.6%, and that of Comparative Example 1 was 23.8% relative to the theoretical discharging capacity of the lithium-sulfur battery. Through this, it was found that the lithium-sulfur battery comprising the lithium salt with an anion donor number of 15 kcal/mol or more shows a higher capacity implementation rate, and the higher the donor number of the anion is, the higher the capacity implementation rate is.

During the discharging process of the lithium-sulfur battery, the decomposition reaction proceeds between the sulfur bonds from $Li_2S_8$ in which 8 sulfur atoms are connected to lithium ions to $Li_2S$ in which the sulfur atom is individually bound to lithium. Generally, in the voltage measurement according to the discharging capacity, it is considered that the first flat voltage range at high voltage comprises the decomposition reaction from $Li_2S_8$ to $Li_2S_4$ and the second flat voltage range at low voltage comprises decomposition from $Li_2S_4$ to $Li_2S$ (lithium sulfide) and accumulation process of solid lithium sulfide in the electrode.

Therefore, it can be seen that in the generation and accumulation process of the lithium sulfide, if the donor number of the anion contained in the lithium salt is 15 kcal/mol or more, the capacity improvement effect in the low voltage range of the battery is shown.

(2) Measurement of Lifetime of Battery

The lifetime characteristics of the batteries manufactured in Examples 1 and 2 and Comparative Example 1 when fixed the charging/discharging rate to 0.335 mA/cm² (0.2 C) and set the operating voltage to 1.8V to 2.7V were measured (FIG. 2).

The batteries of Examples 1 and 2 and Comparative Example 1 showed almost no decrease in the capacity of the battery even when the cycle progressed, thereby showing excellent lifetime characteristics.

However, the batteries of Examples 1 and 2 showed better capacities than the battery of Comparative Example 1.

(3) Observation of Surface of Electrode

The electrodes of the batteries of Examples 1 and 2 and Comparative Example 1 in which discharging was completed were observed with a scanning electron microscope (FIGS. 3 to 5).

It can be seen that the electrode of Comparative Example 1 using LiTFSI as a lithium salt showed that the lithium sulfide was grown into a two-dimensional film structure on the surface of the carbon electrode, and thus the lithium sulfide, which is non-conductive, covered the entire active surface area of the electrode.

On the other hand, it can be seen that the electrodes of Examples 1 and 2 using LiTF and LiBr as lithium salts, respectively, showed that the lithium sulfide was grown into a three-dimensional structure on the electrodes.

It can be seen that in the case of Examples 1 and 2, since the lithium sulfide did not cover the entire surface of the electrodes as in Comparative Example 1, the batteries of Examples 1 and 2 have an effect in retarding the passivation rate of the surface of the electrode even though the same capacity was discharged It is considered that the above results are related to the result that (1) the capacity implementation rate in the low voltage range shown in the constant current operation profile measurement is superior.

(4) Analysis of Surface of Electrode

The surface of the electrode when discharged the electrodes of the batteries of Examples 1 and 2 and Comparative Example 1 by the same capacity was measured using XPS (FIG. 6).

It was confirmed that in the case of Comparative Example 1, the C—C binding signal detected from the carbon was greatly reduced, and thus it was confirmed that this was due to the relatively large amount of lithium sulfide accumulated on the surface. On the other hand, in the case of Examples 1 and 2, the carbon signal was still high and the surface detection rate of lithium sulfide was also significantly low.

Therefore, it can be seen that in the case of the electrodes of Examples 1 and 2, lithium sulfide may grow three-dimensionally, thereby delaying the passivation of the electrode.

(5) Measurement of Passivation Rate of Electrode Surface Using Chronoamperometry The growth rate of lithium sulfide in the batteries of Examples 1 and 2 and Comparative Example 1 was measured using chronoamperometry.

The growth rate was measured using the following equation (1). The results are shown in Table 1 and FIG. 7 below.

$$t_m = \left(\frac{\rho^2}{2\pi M^2 N_0 k_g^2}\right)^{\frac{1}{2}}$$

$t_m$=time at which the maximum current value appears in graph of current versus time by the chronoamperometry
$\rho$=density of lithium sulfide
$N_o k_g^2$=growth rate of lithium sulfide in two-dimensional direction
M=molecular weight of lithium sulfide

TABLE 1

| Two-dimensional growth rate | Comparative Example 1 | Example 1 | Example 2 |
|---|---|---|---|
| $t_m$ | 234.84 | 378.44 | 712.92 |
| $N_o k_g^2$ | $3.766 \times 10^{-9}$ | $1.450 \times 10^{-9}$ | $4.087 \times 10^{-10}$ |

In the results of Table 1, the value of $k_g^2 N_o$, which can be interpreted as the growth rate of lithium sulfide in the two-dimensional direction was measured to be about 2.6 times slower than that of Comparative Example 1 in the case of Example 1 and about 10 times slower than that of Comparative Example 1 in the case of Example 2. Therefore, it can be seen that Examples 1 and 2 can delay the passivation of the electrode by the lithium sulfide as compared with Comparative Example 1. Also, it can be seen that the higher the donor number of the anion is, the more delayed the passivation of the electrode is.

As described above, the present invention uses a lithium salt comprising an anion having a donor number of 15 kcal/mol or more to cause lithium sulfide to grow three-dimensionally on the surface of the electrode, thereby preventing lithium sulfide from covering the surface of the electrode and delaying the passivation of the electrode and thus achieving a high discharging capacity relative to the theoretical discharging capacity of the battery.

The invention claimed is:
1. A lithium-sulfur battery comprising:
a positive electrode and a negative electrode arranged opposite to each other;
a separator interposed between the positive electrode and the negative electrode; and
an electrolyte solution which is impregnated in the positive electrode, the negative electrode and the separator,
wherein the electrolyte solution has ion conductivity, and
wherein the electrolyte solution comprises:
a lithium polysulfide;

a non-aqueous solvent consisting of an ether solvent, which is a mixture of a linear ether and a cyclic ether, wherein the cyclic ether comprises at least one selected from the group consisting of dioxolane, methyldioxolane, dimethyldioxolane, vinyldioxolane, methoxydioxolane, ethylmethyldioxolane, dioxane, and trioxane; and a lithium salt, wherein the lithium salt consists of LiBr, wherein the concentration of the lithium salt is in a range of 1M to 4M, wherein the electrolyte solution delays passivation by increasing the degree of dissociation of lithium sulfide so as to induce three-dimensional growth of the lithium sulfide on the positive electrode, and wherein the electrolyte comprises dissolved lithium polysulfide that is obtained by the reaction of sulfur and lithium sulfide prior to the operation of the battery.

2. The lithium-sulfur battery of claim 1, wherein the linear ether comprises at least one selected from the group consisting of dimethyl ether, diethyl ether, dipropyl ether, dibutyl ether, diisobutyl ether, ethylmethyl ether, ethylpropyl ether, ethyltert-butyl ether, dimethoxymethane, trimethoxymethane, dimethoxyethane, diethoxyethane, dimethoxypropane, diethyleneglycol dimethylether, diethyleneglycol diethylether, triethyleneglycol dimethylether, tetraethyleneglycol dimethyl ether, ethyleneglycol divinylether, diethyleneglycol divinylether, triethyleneglycol divinylether, dipropyleneglycol dimethyl ether, butylene glycol ether, diethyleneglycol ethylmethylether, diethyleneglycol isopropylmethylether, diethyleneglycol butylmethyl ether, diethyleneglycol tert-butylethylether and ethyleneglycol ethylmethylether.

3. The lithium-sulfur battery of claim 1, wherein the ether solvent comprises the linear ether and the cyclic ether in a volume ratio of 1:0.3 to 1:2.

* * * * *